(12) United States Patent
Joung et al.

(10) Patent No.: US 9,471,043 B2
(45) Date of Patent: Oct. 18, 2016

(54) SMART WATCH (71) Applicant: LG ELECTRONICS INC., Seoul (KR)

(72) Inventors: Wonseok Joung, Seoul (KR); Guang Jang, Seoul (KR); Jihyun Kim, Seoul (KR); Kyoungha Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 194 days.

(21) Appl. No.: 13/968,077

(22) Filed: Aug. 15, 2013

(65) Prior Publication Data

US 2015/0003210 A1  Jan. 1, 2015

Related U.S. Application Data (60) Provisional application No. 61/809,892, filed on Apr. 9, 2013.

(30) Foreign Application Priority Data

Jun. 28, 2013  (KR) .......................... 10-2013-0075030

(51) Int. Cl.
*G04B 37/00* (2006.01)
*G04G 17/08* (2006.01)
*G04G 17/00* (2013.01)
*G04G 21/00* (2010.01)
*G06F 1/16* (2006.01)
*G06F 1/32* (2006.01)
(Continued)

(52) U.S. Cl.
CPC .............. *G04G 17/08* (2013.01); *G04G 17/00* (2013.01); *G04G 21/00* (2013.01); *G06F 1/163* (2013.01); *G06F 1/1647* (2013.01); *G06F 1/1694* (2013.01); *G06F 1/3265* (2013.01); *G06F 3/016* (2013.01); *G04B 37/1486* (2013.01); *G06F 2200/1637* (2013.01); *Y02B 60/1242* (2013.01)

(58) Field of Classification Search
CPC  G04B 47/00; G04B 37/1486; G04B 37/005; A44C 5/14; G04G 17/08; G04G 17/00; G04G 21/00
USPC .......................................... 368/282; 348/376
See application file for complete search history.

(56) References Cited

U.S. PATENT DOCUMENTS 5,686,882 A * 11/1997 Giani .................. G04G 13/028
                                                         340/407.1
5,764,594 A *  6/1998 Berman ................. G04B 25/04
                                                             368/12
(Continued)

FOREIGN PATENT DOCUMENTS

EP              1637969 A2    3/2006
KR     10-2000-0038671 A     7/2000

*Primary Examiner* — Sean Kayes
(74) *Attorney, Agent, or Firm* — Birch, Stewart, Kolasch & Birch, LLP (57) ABSTRACT

A smart watch is disclosed in which a part of the wrist of a user connected to the palm when the smart watch is worn by the user is constructed to be thin. According to an embodiment, the smart watch includes a display part configured to display digital content, a first connection part connected to one side of the display part, the first connection part including a camera unit, a second connection part connected to the other side of the display part, the second connection part including a battery unit, and a comfort part configured to connect the first connection part and the second connection part, wherein thickness of the comfort part is thinner than thickness of the display part, the first connection part, and the second connection part.

20 Claims, 6 Drawing Sheets

(51) Int. Cl.
*G06F 3/01* (2006.01)
*G04B 37/14* (2006.01)

(56) References Cited

U.S. PATENT DOCUMENTS

| | | | | |
|---|---|---|---|---|
| 5,878,004 | A * | 3/1999 | Miyauchi | G04G 13/021 368/230 |
| 6,088,017 | A * | 7/2000 | Tremblay | G06F 3/011 345/156 |
| 6,540,396 | B1 * | 4/2003 | Barras | G04G 17/083 368/12 |
| 6,809,774 | B1 * | 10/2004 | Yamazaki et al. | 348/373 |
| 7,173,881 | B1 * | 2/2007 | Freudenberg, Jr. | G04F 10/00 340/540 |
| 7,251,197 | B2 | 7/2007 | Yoshida et al. | |
| 7,618,260 | B2 * | 11/2009 | Daniel et al. | 439/37 |
| 2001/0011025 | A1 * | 8/2001 | Ohki et al. | 455/556 |
| 2001/0017663 | A1 * | 8/2001 | Yamaguchi et al. | 348/373 |
| 2002/0051075 | A1 * | 5/2002 | Yamaguchi et al. | 348/376 |
| 2002/0180586 | A1 * | 12/2002 | Kitson et al. | 340/5.82 |
| 2003/0081506 | A1 | 5/2003 | Karhu | |
| 2007/0279852 | A1 | 12/2007 | Daniel et al. | |
| 2008/0087870 | A1 | 4/2008 | Williams et al. | |
| 2008/0151695 | A1 * | 6/2008 | Kimel et al. | 368/10 |
| 2009/0028005 | A1 * | 1/2009 | You et al. | 368/10 |
| 2009/0231960 | A1 * | 9/2009 | Hutcheson | 368/10 |
| 2011/0182151 | A1 | 7/2011 | Geyer et al. | |
| 2014/0177399 | A1 * | 6/2014 | Teng et al. | 368/204 |

* cited by examiner

SMART WATCH

Pursuant to 35 U.S.C. §119(a), this application claims the benefit of Korean Patent Application No. 10-2013-0075030, filed on Jun. 28, 2013, which is hereby incorporated by reference as if fully set forth herein. In addition, the present application further claims benefit of U.S. Provisional Application No. 61/809,892, filed Apr. 9, 2013.

BACKGROUND OF THE INVENTION

1. Field of the Invention

The disclosure relates to a smart watch, and more particularly, to a smart watch in which, when the wrist of a user wearing the smart watch touches a table, a part of the smart watch located at lower part is constructed to be thin.

2. Discussion of the Related Art

With advances in technology, various wearable devices capable of being worn by a user body have appeared. A wearable device refers to a device which can be worn by a user as some portions of clothes, etc., by achieving small size and light weight so that a user may freely use the device while in motion. For example, the wearable device may include a smart watch and a head mounted display (HMD). The wearable device may be paired with another device such as a smart phone to perform various functions.

Meanwhile, a smart watch among wearable devices is worn on the user's wrist and may perform a variety of functions including a clock function. That is, a user may receive messages, use social network services (SNSs), or receive telephone calls. In this case, the smart watch needs to be made such that, when the user wearing the smart watch rests their arm on a table, the arm of the user may be comfortable.

SUMMARY OF THE INVENTION

Accordingly, the present invention is directed to a smart watch that substantially obviates one or more problems due to limitations and disadvantages of the related art.

An object of the disclosure is to provide a smart watch that a user can comfortably use by varying the thickness of a part of the smart watch which touches a table, when the user wearing the smart watch rests the arm on the table, and the opposite part of the smart watch.

Another object of the present invention is to provide a smart watch capable of variously providing a display screen used according to the angle of the wrist on which the smart watch is worn by providing a plurality of display screens on the smart watch.

Another object of the present invention is to provide a smart watch which includes a tactile feedback unit on a portion thereof contacting the wrist of a user and can inform a user whether there is content that is not displayed on a display screen, through tactile feedback, while displayed content is provided to the user using smart watch.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a smart watch includes a display part configured to display digital content, a first connection part connected to one side of the display part, the first connection part including a camera unit, a second connection part connected to the other side of the display part, the second connection part including a battery unit, and a comfort part configured to connect the first connection part and the second connection part, wherein thickness of the comfort part is thinner than thickness of the display part, the first connection part, and the second connection part.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Although the terms used in the disclosure are selected from generally known and used terms while considering functions of the disclosure, they may vary according to intention or customs of those skilled in the art or to emergence of new technology. Some of the terms mentioned in the description of the disclosure may have been selected by the applicant at his or her discretion, and in such cases the detailed meanings thereof will be described in relevant parts of the description herein. Thus, the terms used in this disclosure should be interpreted based on the substantial meanings of the terms and the whole content of this disclosure rather than their simple names or meanings.

Embodiments will be described below in detail with reference to the attached drawings, which should not be construed as limiting the embodiments.

Figure 1:
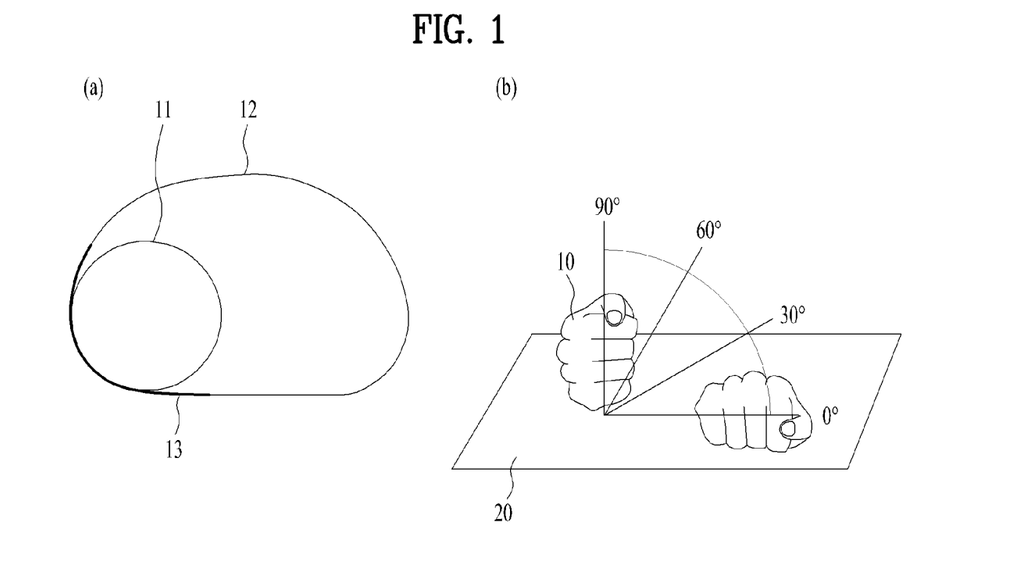
FIG. 1 is a view illustrating the shape and slope of the wrist of a user.

FIG. 1 is a view illustrating the shape and slope of the wrist of a user. More specifically, FIG. 1(a) illustrates the shape of the wrist of a user and FIG. 1(b) illustrates the slope of the wrist of a user.

The wrist of a user has a shape shown in FIG. 1(a) according to the shape of bones arranged in the wrist and a cross-sectional surface 12 of the wrist is not perfectly elliptical. A part indicated as a circle denotes an ulna 11. The ulna 11 corresponds to a bone that touches a surface when the arm of the user is rested on a surface. For example, when the user does work in a state that the arm is rested on a table, a lower part 13 of the ulna 11 contacts the table. Accordingly, when the user wearing a smart watch does work or performs a task with the arm rested on the table for a long time, if a part corresponding to the position of the ulna out of a strap of the smart watch worn on the wrist is thick, the user may feel that the wrist is unnatural or uncomfortable.

Referring to FIG. 1(b), when the arm of a user 10 is rested on a table 20, the wrist of the user can be rotated within the range of 0° to 90°. It is assumed that the case where the angle between the palm of the user and the table forms a right angle is 90° rotation and the case where the palm faces the table is 0° rotation. For example, a general rotation angle of the wrist when the arm is rested on the table corresponds to about 30° to 60°. That is, when the arm is rested on the table at a rotation angle of about 30°, the user may recognizes that the arm is naturally rested on the table. As another example, the rotation angle of the wrist may become 90° in some cases. That is, since the wrist can be rotated by from 0° to 90°, the user may use the arm rested at various angles in different ways.

Therefore, the present disclosure provides a smart watch allowing the arm of the user to comfortably rest in consideration of the location of the ulna 11 when the arm of the user wearing the smart watch is rested on a table. The present disclosure also provides a smart watch allowing a user to easily use displayed content according to the angle of the arm of the user wearing the smart watch. This will be described with reference to FIG. 2 to FIG. 9.

Figure 2:
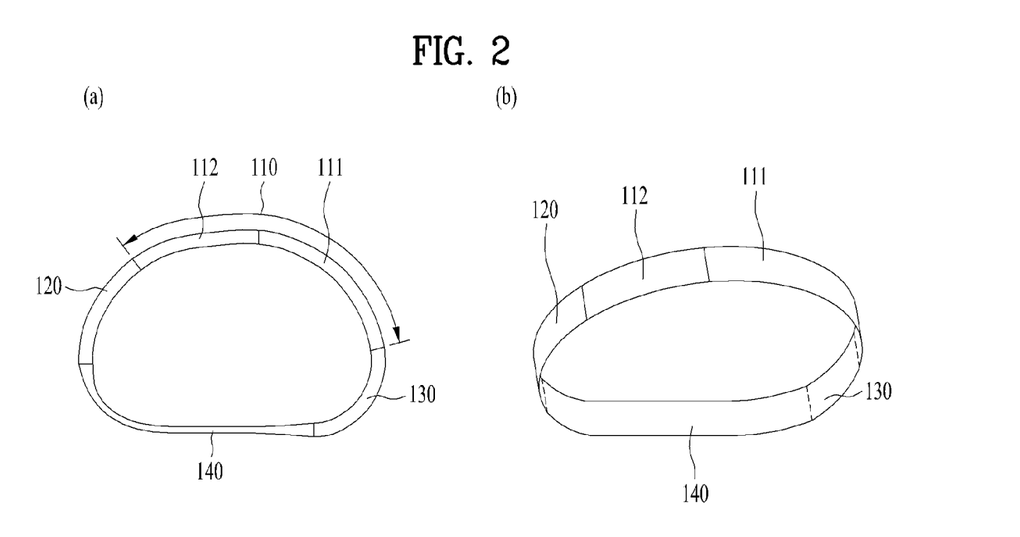
FIG. 2 is a view illustrating the configuration of a smart watch of the present disclosure.

FIG. 2 is a view illustrating the configuration of a smart watch of the present disclosure. More specifically, FIG. 2(a) is a smart watch 100 viewed from the side and FIG. 2(b) is a smart watch 100 viewed downward at an angle of 45°.

In the present disclosure, the smart watch 100 may include a display part 110, a first connection part 120, a second connection part 130, and a comfort part 140. In this disclosure, the smart watch 100 may be a strap type.

The display part 110 may display visual information. For example, the display part 110 may display digital content. The display part 110 may include a main display part 111 and a sub display part 112. The main display part 111 may correspond to a display part mainly used by a user. As described with reference to FIG. 1, since a natural angle when the user rests their arm on a table is about 30° to 60°, the user easily views the main display part 111. Accordingly, referring to FIG. 2(a), when the arm of the user is rested on the table at an angle of about 30° to 60°, the user mainly views the main display part 111.

The sub display part 112 is a display part having lower priority than the main display part 111 and may display digital content, alone or together with the main display part 111. As described with reference to FIG. 1, since the user can view the sub display part 112 only when the wrist is rotated at an angle of 0° to 30° from the case where the palm faces the table, the user may use the sub display part 112 less frequently than the main display part 111.

The main display part 111 may be a part providing a display area irrespective of whether power is supplied or not. That is, even though power is not supplied, the main display part 111 may be provided to the user as a display part. On the other hand, the sub display part 111 may provide a display area to the user only when power is supplied. That is, when power is not supplied, the sub display part 112 is provided to the user as a strap rather than as a display part of the smart watch and, only when power is supplied, the sub display part 112 provides a display area to the user. For example, at least one of the main display part 111 and the sub display part 112 may be comprised of a liquid crystal display (LCD), a light emitting diode (LED) display, an organic light emitting diode (OLED) display, or an e-paper screen. Meanwhile, the display part 110 may include a sensor unit for detecting an input signal. This will be described with reference to FIG. 4.

Next, the first connection part 120 may correspond to a part connected to one side of the display part 110. For example, the first connection part 120 may be connected to the sub display part 112 of the display part 110. That is, the first connection part 120 is located at the outer side of the arm of the user and may include a camera unit. The first connection part 120 may include a communication unit for transmitting/receiving data. Through the above configuration, the smart watch 100 may perform near field communication (NFC). In an aspect of accessibility for NFC, the communication unit may be positioned in the first connection part 120 so that the smart watch 100 and an external device can easily contact each other. This will be described with reference to FIG. 4.

The second connection part 130 may be connected to the other side of the display part 110. For example, the second connection part 130 may be connected to the main display part 111 of the display part 110. That is, the second connection part 130 is located at the inner side of the arm of the user wearing the smart watch 100 and may include a battery unit. The second connection part 130 is located at a part that the user cannot view when the arm of the user is rested on the table at an angle of 30° to 60°.

The first connection part 120 and the second connection part 130 may occupy less area in the smart watch 100 than the display part 110 and the comfort part 140. At least one of the first connection part 120 and the second connection part 130 may include a locking part. This is because, when the locking part is located at the first connection part 120 or the second connection part rather than at the display part 110 and the comfort part 140, the user wearing the smart watch 100 can conveniently use the smart watch 100. The locking part may correspond to a reference part for distinguishing between a smart watch worn state and a smart watch non-worn state. For example, the locking part may include a buckle, etc.

The comfort part 140 is connected between the first connection part 120 and the second connection part 130 and may interconnect the first connection part 120 and the second connection part 130. The comfort part 140 may be thinner in thickness than the display part 110, the first connection part 120, and the second connection part 130. This is because, when the arm of the user is rested on the table, a part corresponding to the comfort part 140 mainly contacts the table as described with reference to FIG. 1.

If the comfort part 140 has the same thickness as the display part 110, the first connection part 120, and the second connection part, the user may feel uncomfortable because the height of the wrist is different from the other part of the arm while the arm of the user contacts a table. Accordingly, the present disclosure provides a smart watch wherein the comfort part 140 has a thin thickness compared with the display part 110, the first connection part 120, and the second connection part 130 so that the user does not feel discomfort caused by the presence of the comfort part 140 when the arm of the user touches the table. Meanwhile, the comfort part 140 may include a tactile feedback unit for providing tactile feedback and an audio input/output unit including a directional speaker and a directional microphone. This will be described with reference to FIG. 4.

Figure 3:
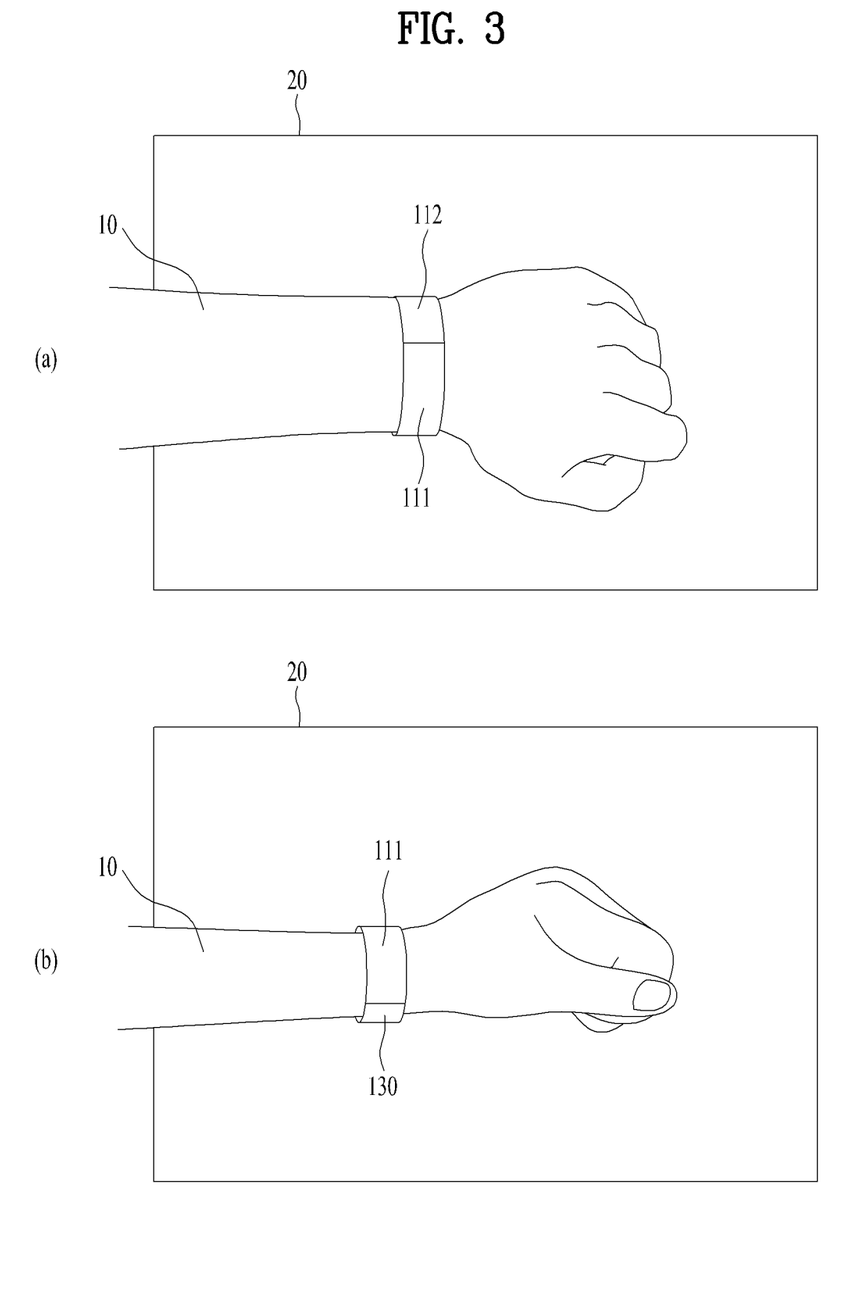
FIG. 3 is a view illustrating the state that a smart watch is worn by a user.

FIG. 3 is a view illustrating the state that a smart watch is worn by a user. More specifically, FIG. 3 illustrates the smart watch 100 worn by the user, viewed according to the angle of the wrist.

FIG. 3(*a*) shows a situation in which the arm of the user 10 is rested on a table 20. That is, as illustrated in FIG. 1(*b*), the angle between the arm of the user 10 and the table is about 0°. In this case, if the user gazes at the arm of the user 10, the user 10 may view the display part 110 of the smart watch 100. More specifically, the user 10 may see both the main display part 111 and the sub display part 112. Hence, the user 10 may use digital content through the sub display part 112 as well as the main display part 111.

FIG. 3(*b*) shows a situation in which the arm of the user 10 is rested in a direction perpendicular to the surface of the table 20. That is, as shown in FIG. 1(*b*), the angle between the arm of the user 10 and the table 20 is about 90°. In this case, if the user 10 gazes at the arm of the user 10, the user 10 may see the display part 110 of the smart watch 100. More specifically, the user 10 may see the main display part 111. Accordingly, the user 10 may use digital content through the main display part 111. In this case, the user 10 may see a portion of the second connection part 130 of the smart watch 100.

As illustrated in FIG. 3(*a*) and FIG. 3(*b*), a display part which can be used by the user 10 varies according to the angle of the arm of the user 10. In addition, in a situation in which the arm of the user contacts the table 20 as in both FIG. 3(*a*) and FIG. 3(*b*), if a comfort part (not shown) is thin, the user may not feel discomfort at the wrist even when the arm of the user 10 contacts the table 20.

Figure 4:
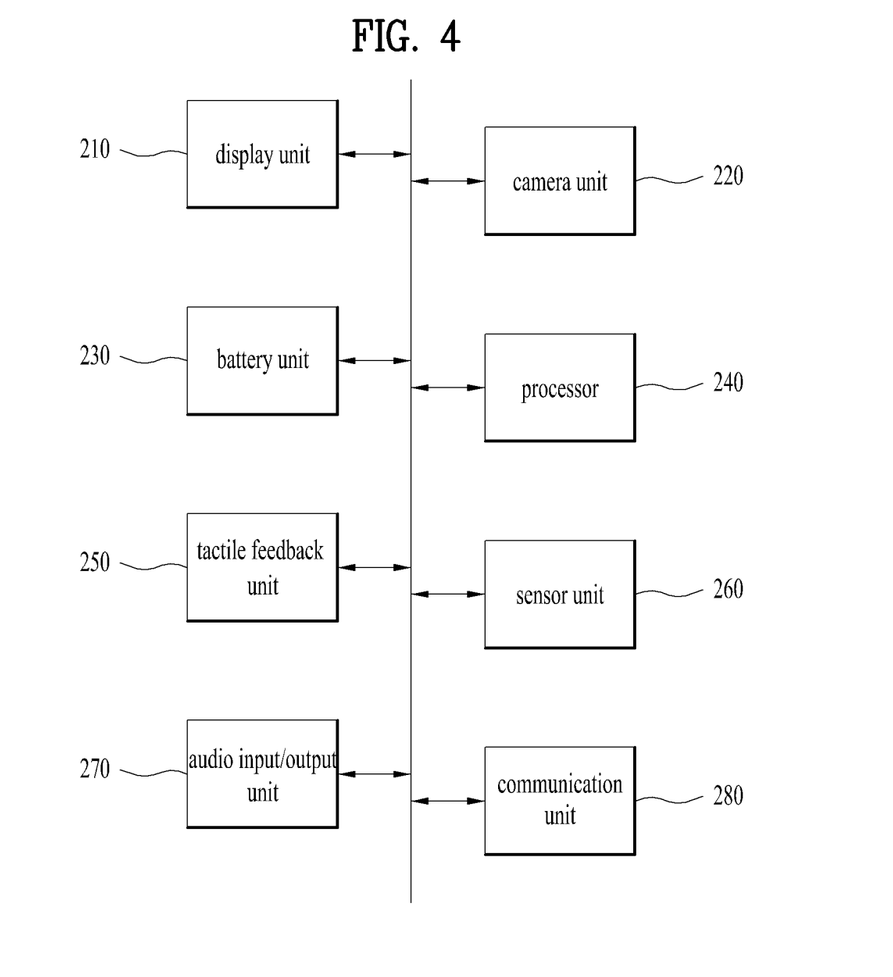
FIG. 4 is a block diagram of a smart watch of the present disclosure.

FIG. 4 is a block diagram of a smart watch of the present disclosure. More specifically, the smart watch 100 may include a display unit 210, a camera unit 220, a battery unit 230, a processor 240, a tactile feedback unit 250, a sensor unit 260, an audio input/output unit 270, and a communication unit 280.

The display unit 210 may display images on a display screen based on content or an application executed by the processor 240 or a control command of the processor 240. In this disclosure, the display unit 210 may be included in the above display part 110 described with reference to FIG. 2. The display unit 210 may correspond to an LCD, an LED display, an OLED display, or e-paper and may be implemented through various displays.

The camera unit 220 may capture an image located at the front part of a camera. More specifically, the camera unit may capture an image in the front direction. In this case, the front direction may be a direction that the camera unit 220 faces. The camera unit 220 may sense an image in a picture angle region and provide the sensed image to the processor 240. The picture angle region indicates the range of horizontal and vertical viewing angles which can be included in a prescribed screen when the image is sensed. In this disclosure, the camera unit 220 may be included in the first connection part 120 described in association with FIG. 2. Accordingly, a user wearing the smart watch 100 may capture an image of the front part through the camera unit 220 installed at the outer side of the smart watch 100.

The battery unit 230 is a power source connected to an inner battery of a device or to external power and may supply power to the smart watch 100. In this disclosure, the battery unit 230 may be included in the above second connection part 130 described with reference to FIG. 2.

The tactile feedback unit 250 may provide tactile feedback. More specifically, the tactile feedback unit 250 may provide tactile feedback based on a control command of the processor 240. For example, tactile feedback may be provided through vibration. In this disclosure, the tactile feedback unit 250 may be included in the above-described comfort part 140. Accordingly, the user wearing the smart watch 100 may sense tactile feedback such as vibration on the lower side of the wrist through the tactile feedback unit 250.

The sensor unit 260 senses peripheral environments of the smart watch 100 using at least one sensor installed at the smart watch 100. The sensor unit 260 may transfer a signal of the sensed result to the processor 240. The sensor unit 260 may sense an input signal provided from the user and transfer the sensed signal to the processor 240.

The sensor unit 260 may include at least one sensing means. As an embodiment, the at least one sensing means may include a gravity sensor, a geomagnetic sensor, a motion sensor, a gyro sensor, an acceleration sensor, an infrared sensor, an inclination sensor, a brightness sensor, an altitude sensor, an olfactory sensor, a temperature sensor, a depth sensor, a pressure sensor, a bending sensor, an audio sensor, a video sensor, a global positioning system (GPS) sensor, a touch sensor, or a grip sensor. The sensor unit 260 refers to the above-described various sensing means. The sensor unit 260 may sense various user input and environments of the smart watch 100 and provide the sensed result to the processor 240 so that the processor 240 may perform operations corresponding to the sensed result. The above-described sensors may be included as separate elements in the smart watch 100 or may be incorporated in at least one element in the smart watch 100.

In this disclosure, the sensor unit 260 may be included in the above display part 110 described with reference to FIG. 2. Especially, the infrared sensor may be included in the display part 110. The smart watch 100 may sense motion of the user or external environments through the infrared sensor included in the display part 110.

The audio input/output unit 270 may detect audio information recognized from the exterior of a device and provide the audio information to the exterior of the device. More specifically, the audio input/output unit 270 may detect the audio information through a microphone and generate the audio information through a speaker.

In this disclosure, the audio input/output unit 270 may be included in the above comfort part 140 of FIG. 2. For example, the smart watch 100 may include a directional microphone and a directional speaker. The directional microphone corresponds to a microphone which may selectively record only sound at a narrow angle heard from a specific direction. The directional speaker may correspond to a speaker which can emit sound only to a prescribed direction as opposed to other speakers.

Therefore, the user may place a telephone call using the directional microphone and speaker included in the smart watch 100. For example, the user wearing the smart watch 100 may place a telephone call by spreading the palm and holding the hand close to their ear. When the user places a phone call through the directional microphone/speaker, the voice of a caller is easy to hear as the palm is rounded. For example, the smart watch 100 may include the directional microphone and the directional speaker such that the directional speaker may be nearer to the body of the user than to the directional microphone when the user covers their ear based on the left hand.

The communication unit 280 may communicate with an external device using various protocols and thus transmit/receive data to/from the external device. The communication unit 280 may be connected to an external network wirelessly or by wire and transmit/receive digital data such as content and applications.

In this disclosure, the communication unit 280 may be included in the first connection part 120 described with reference to FIG. 2. Especially, in this disclosure, the smart watch 100 may perform NFC through the communication unit 280.

The smart watch 100 illustrated in FIG. 4 is shown in block form according to an embodiment. Separate blocks are logically distinguished elements in the device. Therefore, the above-described elements of the device may be incorporated into one or plural chips according to device design.

In embodiments of FIG. 5 to FIG. 9 which will be described hereinbelow, operations performed by the smart watch 100 may be controlled by the processor 240. For convenience, the operations explained below are illustrated and described as being performed/controlled by the smart watch 100.

Figure 5:
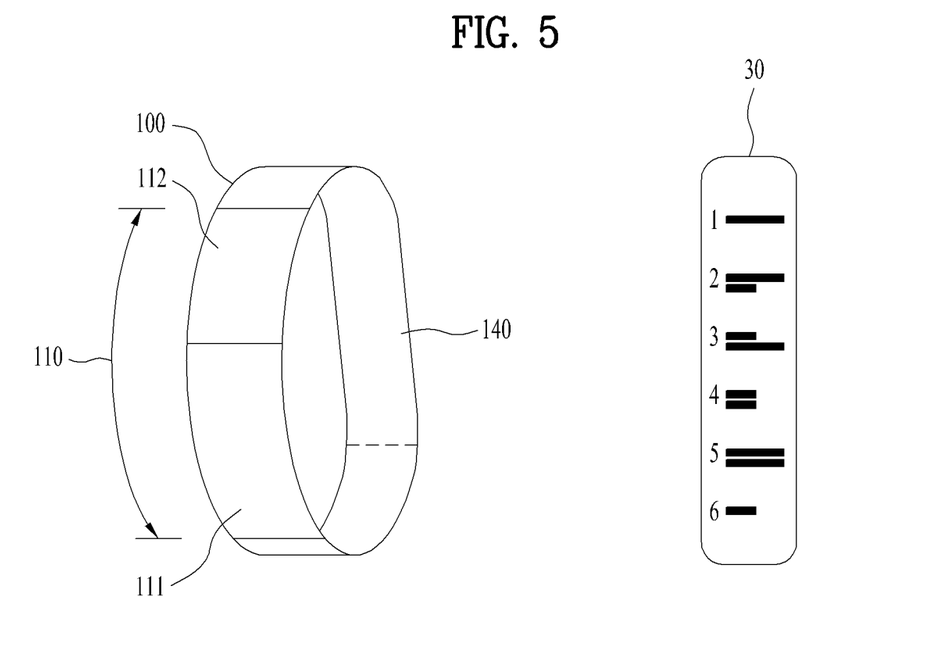
FIG. 5 is a view illustrating an embodiment of displaying digital content on a display part of a smart watch of the present disclosure.

FIG. 5 is a view illustrating an embodiment of displaying digital content on a display part of a smart watch of the present disclosure. More specifically, FIG. 5 illustrates an embodiment of a main display part 111 and a sub display part 112 of the smart watch 100 and a digital content 30 displayed on a display part.

The smart watch 100 illustrated in the left of FIG. 5 includes the main display part 111 and a sub display part 112. The smart watch 100 includes a comfort part 140 on the opposite side of the display parts. The digital content displayed in the right of FIG. 5 may correspond to content which is scheduled to be displayed on the smart watch 100. For example, the digital content 30 is continuous content and may include a document content such as an e-book. The digital content 30 shown in the right of FIG. 5 is content listed from the top to bottom and numbers 1 to 6 denote a relative order in a portion of the content. Accordingly, the content shown in FIG. 5 may further include other parts before 1 or after 6 in addition to parts shown by 1 to 6.

In this disclosure, the smart watch 100 may generate tactile feedback on the comfort part 140 in correspondence to the length of the digital content 30 displayed in the display part 110. The tactile feedback may be generated in correspondence to the length of a part of the digital content 30 that is not displayed on the display part 110. For example, if the length of the digital content 30 can be sufficiently accommodated by the display part 110, the smart watch 100 does not generate tactile feedback. The tactile feedback is generated to inform the user wearing the smart watch 100 of the length of the displayed content.

Figure 6:
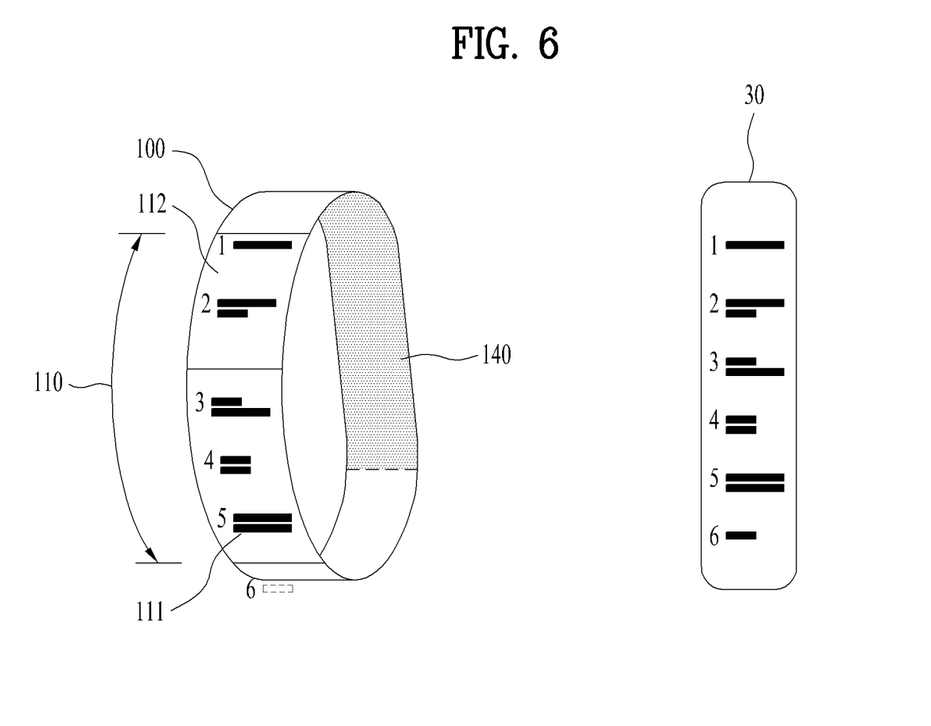
FIG. 6 is a view illustrating an embodiment of displaying digital content on a display part of a smart watch of the present disclosure.

FIG. 6 is a view illustrating an embodiment of displaying digital content on a display part of a smart watch of the present disclosure. More specifically, FIG. 6 illustrates the case of displaying the digital content 30 using the main display part 111 and the sub display part 112.

The smart watch 100 may use the entire display part 110 to display the digital content 30. For example, the smart watch 100 may activate both the main display part 111 and the sub display part 112. In this case, the angle of the wrist of the user wearing the smart watch 100 may correspond to an angle at which the user can easily use both the main display part 111 and the sub display part 112. Here, the displayed digital content 30 may be document content.

As illustrated in FIG. 6, the smart watch 100 may display a front part of digital content in order on the sub display part 112 located at the upper side of the display part 110 and may display a rear part of digital content in order on the main display part 111 located at the lower side of the display part 110. This is because, when both the main display part 111 and the sub display part 112 are used, the user recognizes the sub display part 112 as an upper part. According to setting, the smart watch 100 may display the front part of digital content in order on the main display part 112 and may display the rear part of digital content in order on the sub display part 111.

In addition, as shown in FIG. 6, the smart watch 100 may display the content 30 on the display part 110. In this case, the length of the display part 110 may be insufficient as compared with the length of the digital content 30 which is scheduled to be displayed. As shown in FIG. 6, the smart watch 100 may display the digital content 30 which is scheduled to be displayed on the display, i.e. parts 1 to 5 among parts 1 to 6. That is, the smart watch 100 may be in a state that part 6 of the digital content 30 which is scheduled to be displayed cannot be displayed.

In this case, the smart watch 100 may sense that part 6 of the digital content that is not displayed is present and generate tactile feedback on the comfort part 140. For example, the tactile feedback may be a vibration alarm. That is, the smart watch 100 may inform the user that there is a part that is not displayed, through tactile feedback.

In one embodiment, tactile feedback may be generated in correspondence to the length of the digital content 30 that is not displayed on the display part 110. Namely, if the length of the digital content 30 that is not displayed is shorter than reference length, tactile feedback may be generated with respect to a partial region of the comfort part 140. If the length of the digital content 30 that is not displayed is longer than reference length, tactile feedback may be generated with respect to all regions of the comfort part 140. In another embodiment, tactile feedback may be generated with respect to all regions of the comfort part 140 when there is digital content that is not displayed, irrespective of the length of the digital content that is not displayed.

Thus, if the user uses the digital content through the display part, whether there is a remaining part of the digital content except for a part capable of being displayed on the display part can be easily recognized through tactile feedback.

Figure 7:
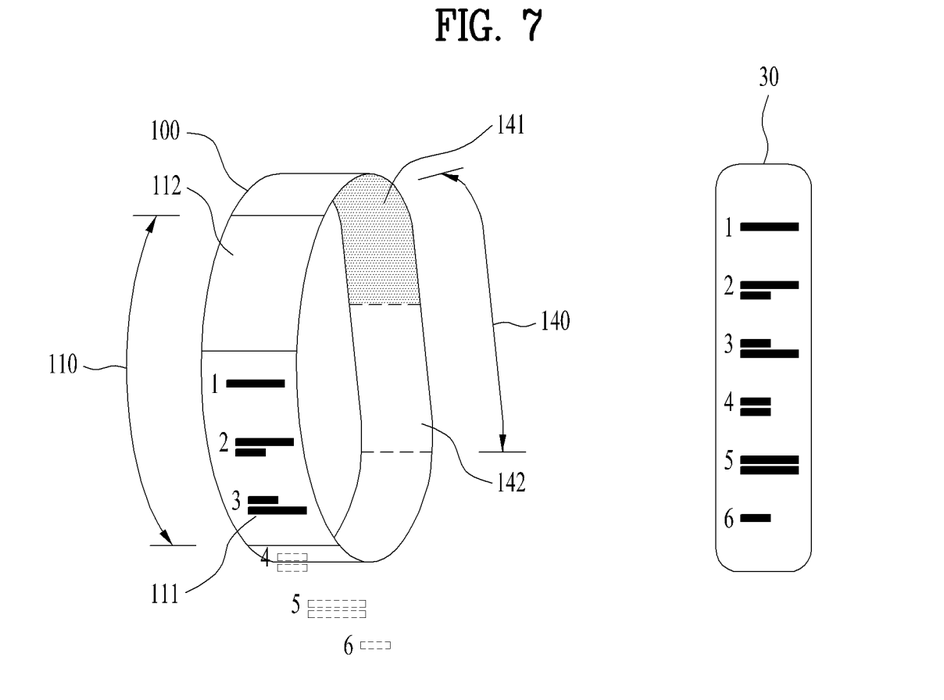
FIG. 7 and FIG. 8 are view illustrating embodiments of displaying digital content on a display part of a smart watch of the present disclosure.
Figure 8:
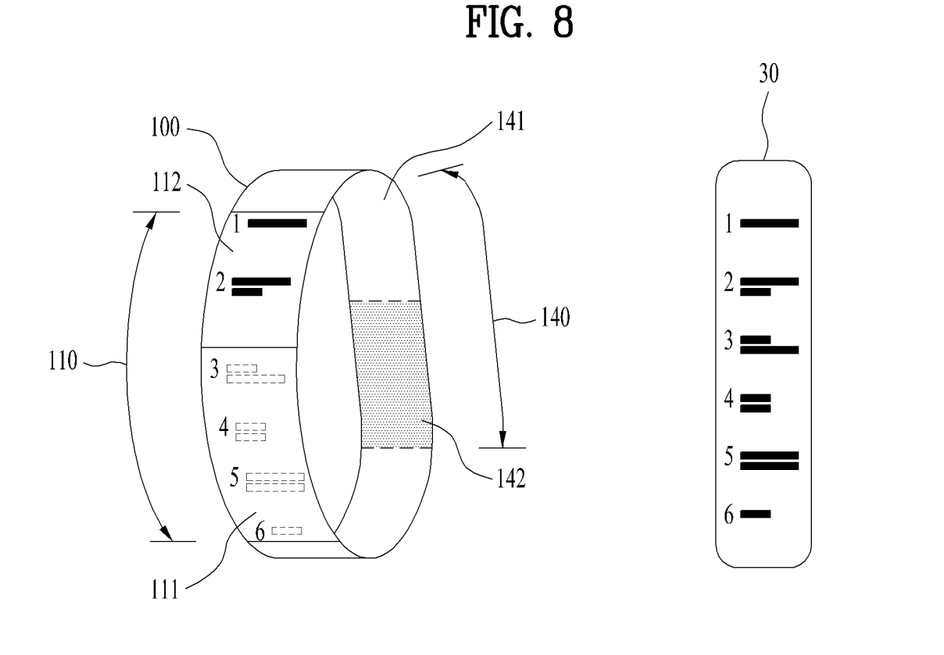

FIG. 7 and FIG. 8 are views illustrating embodiments of displaying digital content on a display part of a smart watch of the present disclosure. More specifically, FIG. 7 and FIG. 8 illustrate the cases of displaying the digital content 30 using only either the main display part 111 or the sub display part 112 of the display part 110.

Referring to FIG. 7 and FIG. 8, the comfort part 140 includes a first comfort part 141 and a second comfort part 142. The first comfort part 141 and the second comfort part 142 are not physically separated parts and may be arbitrarily separated regions for generating tactile feedback by distinguishing between parts. Accordingly, when there is a part of the digital content 30 that is not displayed on the main display part 111, the smart watch 100 may generate tactile feedback on the first comfort part 141. When there is a part of the digital content 30 that is not displayed on the sub display part 112, the smart watch 100 may generate tactile feedback on the second comfort part 142. The region generating tactile feedback may be configured unlike the above case.

In the embodiment of FIG. 7, the smart watch 100 may use the main display part 111 to display the digital content 30. For example, the sub display part 112 of the smart watch 100 may be in a deactivated state. In addition, as described in FIG. 3, the angle of the arm of the user wearing the smart watch 100 may be 90°. The smart watch 100 may display a portion of the digital content 30, which is scheduled to be displayed, on the main display part 111. As illustrated in FIG. 7, the smart watch 100 may display only parts 1 to 3 of the digital content 30 on the main display part 111.

In this case, the smart watch 100 may sense that a portion of the digital content 30 has not been displayed and provide tactile feedback on the first comfort part 141. Then, the user can easily recognize that a portion of content which is being displayed on the display part 110 has not been displayed.

In the embodiment of FIG. 8, the smart watch 100 may use the sub display part 112 to display the digital content 30. For example, the main display part 111 of the smart watch 100 may display content different from content displayed on the sub display part 112. For example, as described in FIG. 3, the angle of the arm of the user wearing the smart watch 100 may correspond to 30° to 60°. The smart watch 100 may display a portion of the digital content 30, which is scheduled to be displayed, on the sub display part 111. As illustrated in FIG. 8, the smart watch 100 may display only parts 1 and 2 of the digital content 30 on the sub display part 112.

In this case, the smart watch 100 may sense that a portion of the digital content 30 has not been displayed and generate tactile feedback on the second comfort part 142. Thus, the user can easily recognize that a portion of content which is being displayed on the display part 110 has not been displayed.

Figure 9:
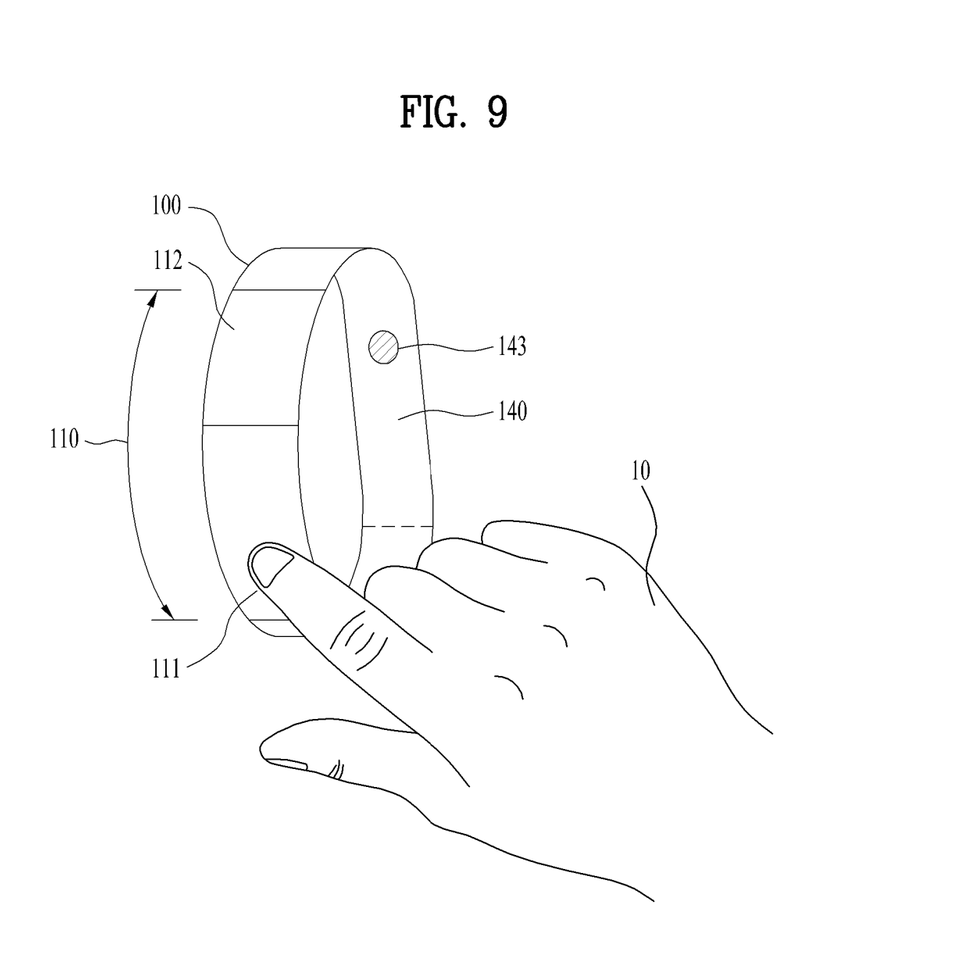
FIG. 9 is a view illustrating an embodiment of generating tactile feedback in response to an input signal for a display part of a smart watch of the present invention.

FIG. 9 is a view illustrating an embodiment of generating tactile feedback in response to an input signal for a display part of a smart watch of the present invention. More specifically, FIG. 9 illustrates the case of detecting an input signal for the display part 110 and generating tactile feedback in correspondence to the detected input signal.

As described in FIG. 4, the smart watch 100 may include a sensor unit in the display part 110 and the sensor unit may include a variety of sensors. The smart watch 100 may detect an input signal for the display part 110 through the sensor unit. The smart watch 100 may control displayed digital content in correspondence to the input signal for the display part 110. For example, referring to FIG. 6 to FIG. 8, the digital content 30, such as a document, may be displayed on the display part 110. Upon detecting the input signal for the display part 110, the smart watch 100 may control the digital content 30 by scrolling the digital content 30 forward and backward or selecting the digital content 30.

The smart watch 100 may sense the pressure of the input signal for the display part 110 through the sensor unit included in the display part 110. As illustrated in FIG. 9, if the pressure of the input signal exceeds a threshold, the smart watch 100 may provide a tactile feedback 143 to the comfort part 140. The threshold may be minimum pressure capable of generating the tactile feedback and may correspond to reference pressure which is set by the user or automatically set by the smart watch 100.

The smart watch 100 may control the strength of the tactile feedback according to the strength of pressure of the input signal. For example, if the pressure of the input signal is less than threshold pressure, the smart watch 100 may weakly generate vibration strength provided as the tactile feedback. As another example, if the pressure of the input signal is greater than the threshold pressure, the smart watch 100 may strongly generate vibration strength provided as tactile feedback.

Meanwhile, the pressure strength of the input signal may be generated based on a sensed area of the input signal. This is because, if the user touches the display part 110 using a finger, the sensed area of the input signal for the display part 110 may be reduced as the pressure of the input signal of the display part 110 is reduced, and the sensed area of the input signal for the display part 110 may be increased as the pressure of the input signal of the display part 110 is increased. Through this process, if the user provides the input signal for the display part, the strength of the input signal can be easily recognized through tactile feedback.

According to an embodiment, since a smart watch suitable for the structure of wrist bone is provided, a user wearing the smart watch can feel comfortable in a situation in which the arm of the user is rested on a table during work, study, etc.

According to another embodiment, a user can variously use a display screen according to the tilt angle of the wrist, using a plurality of display screens located at the upper part of the smart watch.

According to a further embodiment, when a user uses document content through tactile feedback, the user can easily recognize whether or not there is a part that is not displayed on a display screen.

While the drawings have been separately described for convenience, the embodiments described in the drawings may be combined to implement a new embodiment. The smart watch according to the present disclosure may be not limitedly applied to the foregoing constructions of the embodiments but selectively configured through combinations of all or some embodiments to make various modifications.

While the disclosure has been particularly shown and described with reference to exemplary embodiments, it will be understood by those of ordinary skill in the art that various changes in form and details may be made therein without departing from the spirit and scope of the disclosure as defined by the following claims. Such modifications should not be individually understood from the technical spirit or prospect of the present disclosure.

What is claimed is:

1. A smart watch, comprising:
   a display part configured to display digital content, the display part including a first display area and a second display area;
   a first connection part connected to one side of the display part, the first connection part including a camera unit;
   a second connection part connected to the other side of the display part, the second connection part including a battery unit; and
   a comfort part configured to connect the first connection part and the second connection part,
   wherein thickness of the comfort part is thinner than thickness of the display part, the first connection part, and the second connection part,
   wherein the second display area is adjacent to the first connection part which includes the camera unit,
   wherein the first display area is configured to provide a display area irrespective of power information of the battery unit and the second display area is configured to provide a display area according to the power information of the battery unit, and wherein the display part further includes a sensor unit configured to detect an input signal and the comfort part further includes a tactile feedback unit configured to provide tactile feedback.

2. The smart watch according to claim 1, further comprising a processor configured to control the camera unit, the battery unit, the sensor unit, and the tactile feedback unit.

3. The smart watch according to claim 2, wherein the processor is further configured to activate at least one of the first display area and the second display area based on an angle of the wrist of a user wearing the smart watch.

4. The smart watch according to claim 2, wherein the processor is further configured to generate tactile feedback on the comfort part in correspondence to length of the digital content.

5. The smart watch according to claim 4, wherein the digital content is continuous.

6. The smart watch according to claim 4, wherein the tactile feedback is generated on the display part in correspondence to length of a part of the digital content that is not displayed.

7. The smart watch according to claim 2, wherein the sensor unit is further configured to detect an input signal for the display part and the processor further configured to control the digital content in correspondence to the input signal.

8. The smart watch according to claim 2, wherein the sensor unit is further configured to sense pressure of an input signal for the display part and the processor is further configured to generate tactile feedback on the comfort part when the pressure of the input signal exceeds a threshold pressure.

9. The smart watch according to claim 8, wherein the processor is further configured to control strength of the tactile feedback according to strength of the pressure of the input signal.

10. The smart watch according to claim 8, wherein the processor is further configured to sense strength of the pressure of the input signal based on an area sensed by the input signal.

11. The smart watch according to claim 2, wherein the first display area corresponds to a main display part and the second display area corresponds to a sub display part.

12. The smart watch according to claim 11, wherein the power information of the battery unit indicates whether power is supplied from the battery unit to at least one of the main display part and the sub display part or not.

13. The smart watch according to claim 11, wherein at least one of the main display part and the sub display part is composed of a liquid crystal display (LCD), a light emitting diode (LED) display, an organic light emitting diode (OLED) display, or an e-paper screen.

14. The smart watch according to claim 11, wherein the comfort part further includes a main comfort part configured to generate tactile feedback on the main display part in correspondence to a part of the digital content that is not displayed and a sub comfort part configured to generate tactile feedback on the sub display part in correspondence to a part of the digital content that is not displayed.

15. The smart watch according to claim 14, wherein the processor is further configured to generate tactile feedback on the main comfort part in correspondence to length of a part of the digital content that is not displayed and generate tactile feedback on the sub comfort part in correspondence to a part of the digital content that is not displayed.

16. The smart watch according to claim 1, wherein the first connection part or the second connection part includes a locking part.

17. The smart watch according to claim 1, wherein the first connection part further includes a communication unit configured to transmit/receive data.

18. The smart watch according to claim 1, wherein the comfort part further includes an audio input/output unit.

19. The smart watch according to claim 18, wherein the audio input/output unit includes at least one of a directional speaker and a directional microphone.

20. The smart watch according to claim 1, wherein the first display area is located adjacent to the second display area.

* * * * *